United States Patent [19]

Feinbloom

[11] 4,232,934
[45] Nov. 11, 1980

[54] UNIVERSAL CONNECTOR ASSEMBLY PARTICULARLY ADAPTED FOR USE WITH FIBER OPTIC CABLES

[75] Inventor: Richard E. Feinbloom, New York, N.Y.

[73] Assignee: Designs for Vision, Inc., New York, N.Y.

[21] Appl. No.: 918,927

[22] Filed: Jun. 27, 1978

Related U.S. Application Data

[62] Division of Ser. No. 791,383, Apr. 27, 1977.

[51] Int. Cl.³ .............................................. G02B 5/16
[52] U.S. Cl. .......................... 350/96.20; 279/15 G; 279/23 R; 279/102
[58] Field of Search ............................. 350/96.20, 96.10; 339/254, 255 R; 362/32; 279/1 SG, 23 R, 66, 102; 285/177, 319; 403/220, 263

[56] References Cited

U.S. PATENT DOCUMENTS

| 1,799,019 | 3/1931 | Mischler | 279/1 SG |
|---|---|---|---|
| 2,607,603 | 8/1952 | Breuer et al. | 279/66 |
| 3,564,231 | 2/1971 | Bruce et al. | 350/96.20 |
| 3,959,612 | 5/1976 | Feinbloom | 200/11 R |

*Primary Examiner*—Stewart J. Levy
*Attorney, Agent, or Firm*—Arthur L. Plevy

[57] ABSTRACT

There is disclosed a universal connector assembly for use with a fiber optic light source to enable accommodation of fiber optic cables of varying diameters. The connector assembly includes a central aperture directed from a top to a bottom surface. A plurality of transverse slots communicate with the aperture. Each slot contains a clamp member which is biased by means of a spring to enable the clamp members to coact with each other within the aperture during a first mode. A cable or rod is inserted in the aperture to force the clamp members and associated springs radially along the slots. When the rod is inserted in the aperture, the springs urge the clamp members to coact with and retain the rod or cable within the aperture to thereby assure an efficient and reliable coupling mechanism capable of accommodating any one of a given number of varying diameter cables.

7 Claims, 7 Drawing Figures

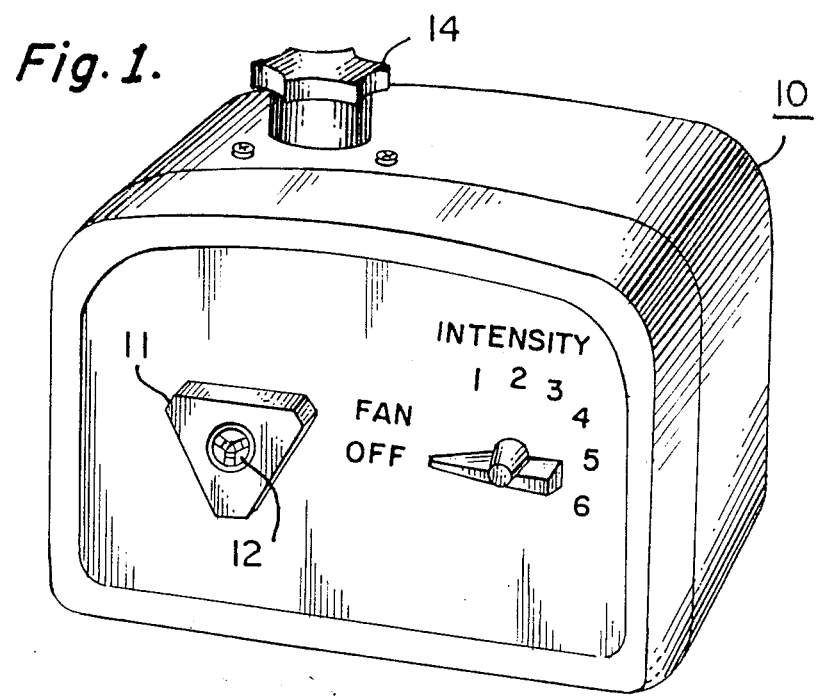
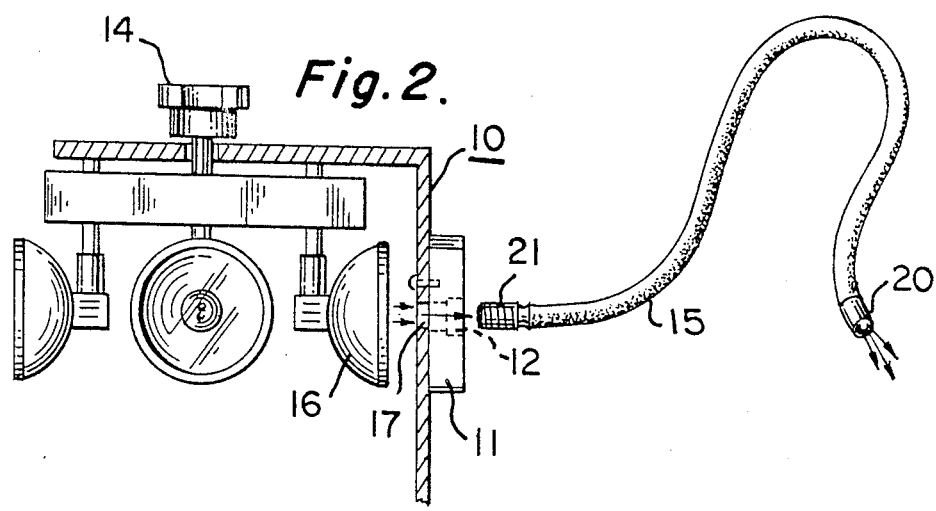
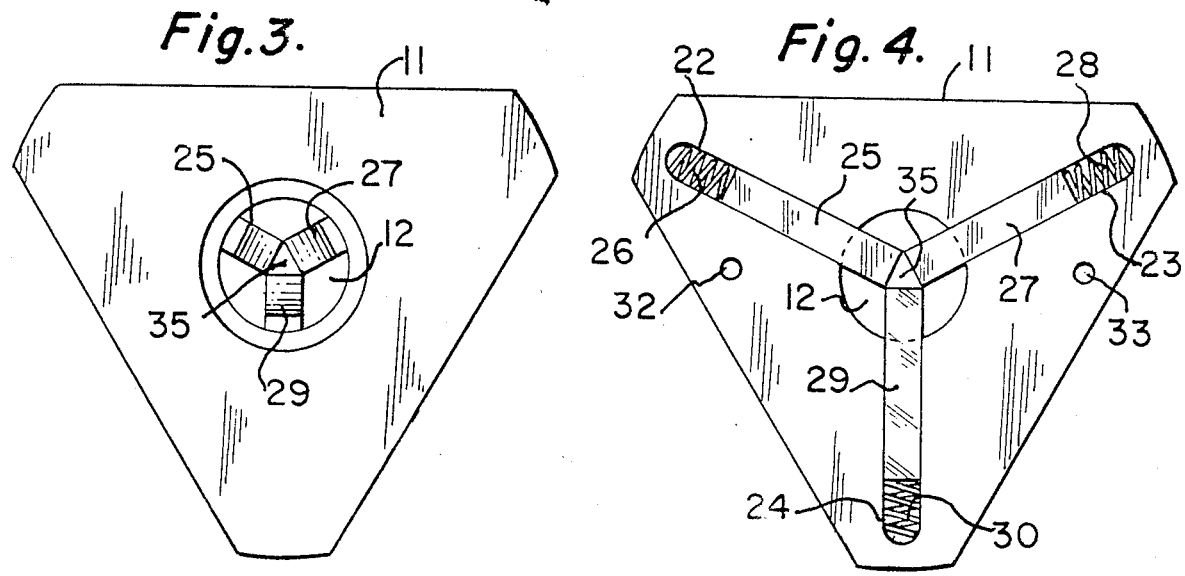

UNIVERSAL CONNECTOR ASSEMBLY PARTICULARLY ADAPTED FOR USE WITH FIBER OPTIC CABLES

This is a Div. of application Ser. No. 791,383, filed Apr. 27, 1977.

BACKGROUND OF INVENTION

This invention relates to a connector assembly and more particularly to a universal connector assembly or socket adapted to accommodate fiber optic cables of varying diameter.

Presently there are many patents and apparatus which employ fiber optic cables to conduct light from a given source. As such, the prior art is cognizant of typical means for connecting or coupling fiber optic cables and there are many patents in the prior art which show various apparatus in the form of connectors or sockets for such cables.

A patent such as U.S. Pat. No. 3,734,594 entitled OPTICAL FIBER CONNECTOR issued on May 22, 1973 shows a connector which holds a cable between a pair of metallic pressure plates. Other patents as U.S. Pat. Nos. 3,982,815; 3,999,841 and 3,989,567 show various means of connecting fiber optic bundles and various connector means.

In any event, the use of a fiber optic cable is relatively widespread in the field of medicine. The fiber optic cable in conjunction with a light source is generally known as a cold light source. In the medical field, the physican or surgeon uses the fiber optic cable to direct light at an area under investigation.

Basically, a fiber optic light source comprises a fiber optic light bundle which is illuminated by a high intensity high wattage lamp. The fiber optic bundle may be several feet long and is positioned in a housing with respect to the lamp so that the filament of the lamp transfers maximum light to the cable. The surgeon uses the fiber optic cable as a light source and can hence direct light in any desired position during an operation or otherwise. The fiber optic cable does not produce or conduct the heat from the light and hence the term "cold light source" has been employed.

In any event, various manufacturers have and do make fiber optic cables of different diameters. The typical diameter of such cables can vary between 3/32" to ½" or more or 2.5 mm to 12.5mm. The various diameters are afforded due to the fact that each manufacturer would like to sell its light source together with its particular cable. Essentially, then a physician or hospital would have to purchase a different light source for each type of fiber optic cable or instrument.

Therefore, it would be desirable to provide a universal connector or socket to be used in conjunction with a light source; which connector would be capable of accommodating fiber optic cables of various diameters.

DESCRIPTION OF THE PREFERRED EMBODIMENT

A connector apparatus for accommodating various diameter fiber optic cable assemblies to be exposed to a source of light contained within a housing upon which said connector apparatus is mounted, comprising of a connector housing member having an aperture directed from a top to a bottom surface, said housing having on a bottom surface, a plurality of transverse slots each communicating with said aperture and each extending transverse thereto towards a side of said housing, a plurality of clamp members, each separate one positioned within an associated one of said slots, and a plurality of spring biasing means, each separate one positioned in one of said slots to coact with and urge said associated clamp member within said aperture to contact each of said clamp members similarly urged by said associated spring whereby a cable inserted in said aperture is retained therein by said clamp members coacting therewith due to the forces exerted by said spring members.

BRIEF DESCRIPTION OF FIGURES

FIG. 1 is a perspective view of a light source housing.

FIG. 2 is a partial cross-sectional view of a light source housing with a connector assembly according to this invention.

FIG. 3 is a top plan view of a connector assembly according to this invention.

FIG. 4 is a bottom plan view of the connector assembly.

DETAILED DESCRIPTION OF DRAWINGS

Figure 5:
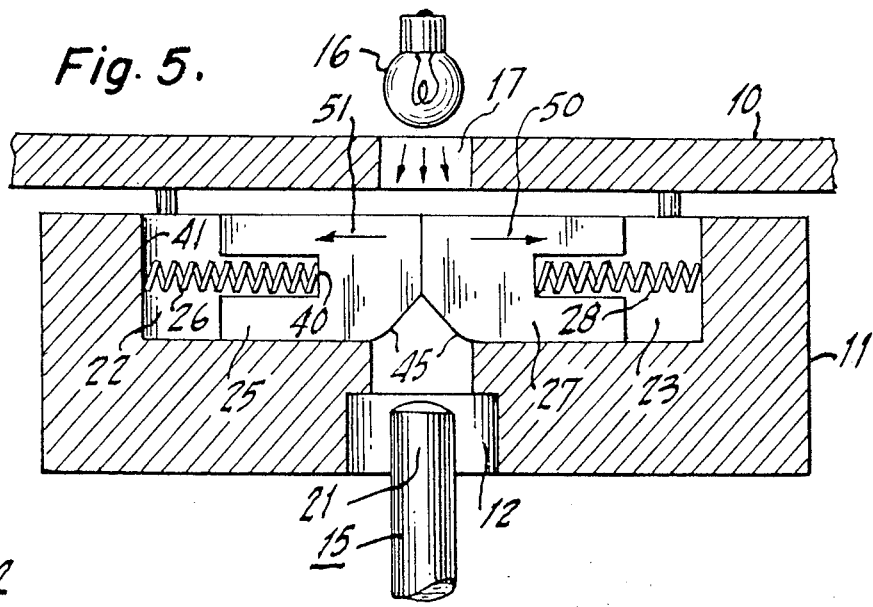
FIG. 5 is a cross-sectional view in diagrammatic form to show the operation of the connector assembly.

Referring to FIG. 1, there is shown a perspective view of a fiber optic light source housing assembly.

The housing 10 of FIG. 1 includes a high intensity light source such as a halogen lamp assembly which may typically operate at 21 volts with 150 watts of power. The lamp assembly is carefully aligned with an aperture in the housing 10 so that light from the lamp filament is concentrated and aligned with the aperture.

Located over the aperture in the housing is a connector block or socket assembly 11. The socket assembly has an aperture 12 which is coaxial with the aperture in the housing 10. As will be explained, the connector block 11 has the ability of accommodating fiber optic cables of varying diameters according to this invention.

The light source 10 has a knob 14 which is used to rotate a new bulb into position if a bulb fails during an operation or during a medical procedure. A source such as 10 is manufactured by the Assignee herein, Designs for Vision, Inc. and marketed under the trademark THE QUADRILITE 4000. The particular details and construction and operation of such a fiber optic light source can be had by referring to U.S. Pat. No. 3,959,612 entitled ROTARY SWITCH ASSEMBLY PARTICULARLY ADAPTED FOR USE WITH FIBER OPTIC LIGHT SOURCES issued on May 25, 1976 to Richard E. Feinbloom and assigned to the Assignee herein. The patent shows a connector assembly for accommodating a particular diameter fiber optic cable.

Referring to FIG. 2, there is shown a cross-sectional view of the housing 10 in order to show the alignment of a fiber optic cable 15 within the aperture 12 of the connector assembly 11.

Essentially, a high intensity lamp 16 is positioned so that the filament of the lamp is aligned with respect to the aperture 17 in the housing to provide maximum light transfer. Positioned on the front surface of the housing is the connector block assembly 11 with its aperture 12 in alignment with the aperture 17 of the housing.

The fiber optic cable 15 is plugged into the aperture 12 of the connector assembly 11 and conducts the light about its output end 20 to enable the physician, as indicated, to direct light at a desired area.

As indicated, the diameter of the fiber optic cable 15 as well as the particular input connector shape 21 can vary substantially from manufacturer to manufacturer and typical variations range from about 2.5 mm to 12.5 mm.

The connector assembly 11, as will be explained, enables one to employ any different type cable 15 with the particular light source. This, thus enables a physician to use a pluality of various diameter cables with a single light source as 10 and be assured of efficient and reliable operation.

Referring to FIG. 3, there is shown the connector or socket assembly 11. The assembly 11 is shown in a top view and is of a relatively triangular shape, but can be as will be seen, of any suitable geometric shape.

The assembly 11 is fabricated from aluminum or some other good structural material. The connector assembly 11 has an aperture 12 directed from the top surface to the bottom surface. The aperture 12 is of a larger diameter at the top surface and is coaxial with a smaller inner diameter and is of a general configuration of a tapered aperture as shown in FIG. 5.

Located within the housing 11 are three transverse slots 22,23 and 24 shown in FIG. 4. Each slot communicates with the aperture 12. Contained in each slot is a C-shaped clamp member which is spring-biased by means of a spring also located in the slot.

Hence, slot 22 contains a C-shaped member 25 biased by a spring 26. Slot 23 contains a C-shaped clamp member 27 biased by a spring 28 and slot 24 contains a C-shaped clamp member 29 biased by a spring 30.

The slots are arranged at angles of one hundred twenty degrees apart. The clamp members 25,27 and 29 have a relatively flat front surface and are urged by their associated springs to contact at the edges; thus forming an opening 35 between the members 25, 27 and 29 in the shape of an equilaterla triangle. The sides of the triangle, as seen, are formed by the edges of the clamp members and are therefore equal. The angles contained within the triangle 35 are sixty degrees.

Also shown on the connector assembly 11 are two apertures 32 and 33 which are used to enable the assembly to be coupled to the front panel of the light source housing 10 by means of screws, bolts or other suitable fasteners.

Referring to FIG. 5, there is shown a diagrammatic view of the C-shaped clamp members within respective slots in order to more clearly represent the nature of operation of the coupling assembly. The entire unit 11 is screwed or otherwise fastened to the front surface of the light source housing 10 with the main axis of the aperture 12 aligned with aperture 17 of the housing 10. The light source 16 is positioned in the housing in alignment with the aperture 17.

The clamp members as 25 and 27 as seen in FIG. 5, are of an inverted C-shape and are relatively identical in configuration and construction with each other and with the clamped member 29 not shown. Each clamp member has a central slot 40 to accommodate one end of a spring as 26 for clamp member 25.

The housing 11, as indicated, has a slot as 22 to accommodate the clamp member 25 and the spring 26.

The other end of the spring 26 coacts with the wall 41 of the associated slot. The clamp member is approximately 15 mm in height and relatively equal to the depth of the slot 22.

As indicated, each slot contains a spring and a clamp member. When the clamp members are positioned in the slots as shown in FIGS. 4 and 5, the force of the springs urges the ends of the clamp members in alignment as shown in FIGS. 3 and 4. Each clamp member further has a rounded angular edge 45 which may be at a suitable angle to permit accommodation of the rod-like end of a fiber optic cable 15.

Shown in FIG. 5 is a fiber optic cable 15 about to be inserted in the aperture 12. The user merely puts the input end of the cable into the aperture 12. The cable coacts with the edges 45 of the C-shaped clamp members and the resultant force urges the clamp members back in directions of the arrows 50 and 51 or towards the back wall of the slots. The springs as 26 and 28 are compressed. As soon as the cable is inserted, the force of the springs on the clamp members assures that the end of the cable is firmly retained and positioned between the clamp members due to the force exerted by the associated springs.

Figure 6:
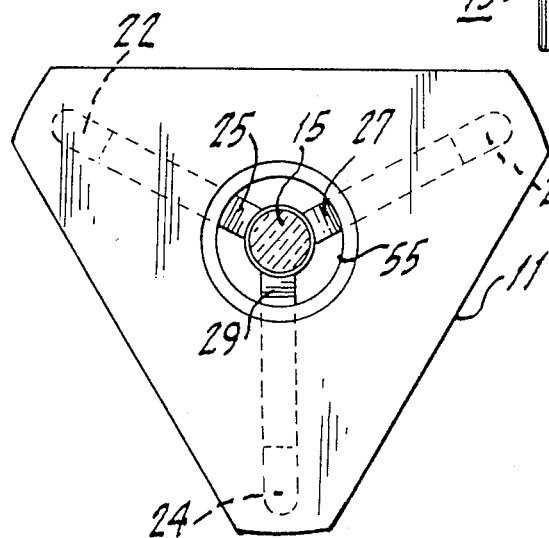
FIG. 6 is a top view showing a cable accommodated by the connector assembly.

In FIG. 6, it can be seen that any cable 15 of any diameter up to the inner diameter 55 of aperture 12, can be accommodated. The entire assembly of the three springs and clamp members is retained in place by the front wall of the light source housing 10.

Figure 7:
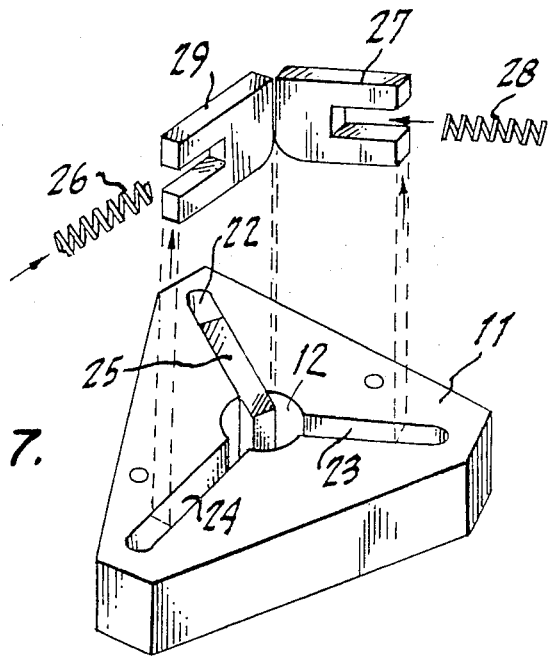
FIG. 7 is a perspective assembly view of the connector assembly.

FIG. 7 shows a simple perspective view to indicate the nature of the slots in coacting with the aperture 12 and the placement of the clamp member 25 and the associated spring 26 therein.

It is important to note that in the configuration shown, each clamp member is relatively symmetrical and fabricated from the same material and being relatively the same size and weight, each spring member is also the same and basically in a particular embodiment, a nine pound steel spring was employed.

Since the cable is retained at three points and spring loaded, it is always centered correctly when inserted with respect to the hole in the light source housing. Furthermore, each clamp member exerts relatively the same force on the cable and hence, the cable experiences a constant tension with automatic centering.

In a typical application, the smallest diameter of the aperture 12 is approximately 13 mm. The length of the small aperture is about 18 mm with the larger aperture 6 mm hence, the height of the connector block being about 24 or 25 mm. The slots which communicate with the smaller aperture are about 15 mm, as is the approximate height of the C-shaped member. The width of the slot is about 5 mm, while the length of the slot from the periphery of the circle is about 20 mm with the length of the C-shaped member being about 18 mm. It is, of course, understood that these dimensions may be varied and changed according to the diameters of the rods or cables to be accommodated as well as the effective width and lengths of the slots and so on.

It is noted that the entire assembly consists of the housing and slots plus three clamped members and three springs and hence, is simple to fabricate and to use.

While the connnector has great utility as a universal socket for a fiber optic cable, it should be apparent that many other uses for retaining varying shaped or diameter rods are contemplated as well.

It is understood that one may vary the particular shape of the clamp members as well as varying the angles and so on without departing from the spirit and scope of the present invention.

I claim:

1. A connector apparatus for accommodating various diameter fiber optic cable assemblies to be exposed to a source of light contained within a housing upon which said connector apparatus is mounted, comprising:

(a) a connector housing member having an aperture directed from a top to a bottom surface, said housing having on a bottom surface, a plurality of transverse slots each communicating with said aperture and each extending transverse thereto towards a side of said housing, said slots extending into said housing for a predetermined depth and of a width substantially narrower than said depth, (b) a plurality of clamp members, each separate one positioned within an associated one of said slots, each of said clamp members of a "C" shaped configuration and located within said slot, with the length of said "C" from said top to bottom arms relatively equal to said predetermined depth and the width of said "C" relatively equal to said width of said slot whereby said "C" member is positioned in said slot in an upstanding relation with said main central side as joining said arms facing said aperture, (c) a plurality of spring biasing means, each separate one positioned in one of said slots to coact with and urge said associated clamp member within said aperture, with said spring biasing means positioned between the arms of said "C" with the main side of said "C" shaped member being forced into said aperture by said spring biasing means to contact each of said clamp members similarly urged by said associated spring to cause said main sides of said clamp members to coact to form a triangular opening with each side relatively equal to the width of said slot, whereby a cable inserted in said aperture is retained therein by said clamp members coacting therewith due to the forces exerted by said spring members.

2. The connector apparatus according to claim 1 with said housing having at least three transverse slots located about and in communication with said aperture.

3. The connector apparatus according to claim 2 wherein said slots are located at 120 degree intervals about said aperture.

4. The connector apparatus according to claim 1 wherein said aperture is of a first larger diameter at said top surface and extending a given distance therefrom and of a smaller coaxial diameter from said given distance towards said bottom surface, with said slots communicating with said smaller diameter of said aperture.

5. The connector apparatus according to claim 1 further including means located on said bottom surface of said housing member for coupling said member to a surface of said housing containing said source of light with said housing surface retaining said spring and clamp members within said connector housing member.

6. A connector apparatus for accommodating various diameter rod configurations, comprising:

(a) a housing having an aperture directed from a top to a bottom surface, said housing having a plurality of transverse slots located on the bottom surface of said housing and each communicating with said aperture, said slots of a given depth as extending from said bottom surface towards said top surface and of a substantially narrower width, (b) A plurality of clamp members, each separate one positioned with an associated one of said slots, each of said clamp members of a "C" shaped configuration and located within said slot with the height of said "C" being relatively equal to said given depth wherein said "C" shaped clamp member stands in said slot with the arms of said "C" located furthest from said aperture in said housing, with the width of said "C" shaped member being relatively equal to the width of said slot, (c) a plurality of spring biasing means, each separate one positioned in one of said slots to coact with and urge said associated clamp member within said aperture, with said spring biasing means positioned between the arms of said "C" with the main side of said "C" shaped member forced into said aperture in said housing by said spring biasing means to contact another of said clamp members similarly urged by said associated spring to cause said main sides of said clamp members to coact to form a triangular opening with each side of said triangle relatively equal to the width of said slot, whereby when a rod is inserted into said aperture, said clamp members compress said associated spring to permit insertion and retain said rod due to the coaction of the same by said clamp and spring members.

7. The connector apparatus according to claim 1 wherein said rod is a fiber optic cable.

* * * * *